United States Patent
Kurzweil

(10) Patent No.: US 9,948,885 B2
(45) Date of Patent: Apr. 17, 2018

(54) VIRTUAL ENCOUNTERS

(75) Inventor: Raymond C. Kurzweil, Newton, MA (US)

(73) Assignee: Kurzweil Technologies, Inc., Newton, MA (US)

( * ) Notice: Subject to any disclaimer, the term of this patent is extended or adjusted under 35 U.S.C. 154(b) by 2146 days.

(21) Appl. No.: 10/735,595

(22) Filed: Dec. 12, 2003

(65) Prior Publication Data

US 2005/0143172 A1 Jun. 30, 2005

(51) Int. Cl.
- *H04N 7/14* (2006.01)
- *G06F 3/01* (2006.01)
- *A63F 13/30* (2014.01)

(52) U.S. Cl.
CPC ............. *H04N 7/141* (2013.01); *A63F 13/12* (2013.01); *G06F 3/011* (2013.01); *G06F 3/016* (2013.01); *H04N 7/14* (2013.01); *A63F 2300/1093* (2013.01); *A63F 2300/5553* (2013.01); *A63F 2300/69* (2013.01)

(58) Field of Classification Search
CPC ......... G06F 3/011; G06F 3/016; H04N 7/141; H04N 7/14
USPC ................ 463/30–32, 34–35, 40–42; 600/38
See application file for complete search history.

(56) References Cited

U.S. PATENT DOCUMENTS

| | | | |
|---|---|---|---|
| 613,809 A * | 11/1898 | Tesla ................................ | 318/16 |
| 4,982,281 A * | 1/1991 | Gutierrez ...................... | 348/151 |
| 5,103,404 A | 4/1992 | McIntosh | |
| 5,111,290 A | 5/1992 | Gutierrez | |
| 5,495,576 A * | 2/1996 | Ritchey .......................... | 345/420 |
| 5,659,691 A | 8/1997 | Durward et al. | |
| 5,845,540 A | 12/1998 | Rosheim | |
| 5,889,672 A | 3/1999 | Schuler et al. | |
| 5,913,727 A * | 6/1999 | Ahdoot ........................... | 463/39 |
| 5,980,256 A | 11/1999 | Carmein | |
| 5,984,880 A | 11/1999 | Lander et al. | |
| 6,005,548 A | 12/1999 | Latypov et al. | |
| 6,016,385 A * | 1/2000 | Yee et al. ...................... | 700/245 |
| 6,275,213 B1 | 8/2001 | Tremblay et al. | |
| 6,368,268 B1 * | 4/2002 | Sandvick et al. ............... | 600/38 |
| 6,583,808 B2 | 6/2003 | Boulanger et al. | |
| 6,695,770 B1 * | 2/2004 | Choy et al. ..................... | 600/38 |
| 6,726,638 B2 | 4/2004 | Ombrellaro | |
| 6,741,911 B2 | 5/2004 | Simmons | |
| 6,752,720 B1 * | 6/2004 | Clapper et al. ................. | 463/58 |
| 6,771,303 B2 | 8/2004 | Zhang et al. | |

(Continued)

FOREIGN PATENT DOCUMENTS

WO WO00/59581 10/2000

OTHER PUBLICATIONS

Hasunuma et al., "Development of Teleportation Master System with a Kinesthetic Sensation of Presence", Retrieved from the Internet, p. 1-7, 1999.

(Continued)

*Primary Examiner* — David Duffy
(74) *Attorney, Agent, or Firm* — Fish & Richardson P.C.

(57) ABSTRACT

A virtual encounter system includes a mannequin coupled to a camera for receiving a video image. The camera sends the video image to a communications network. The virtual encounter system also includes a processor for overlaying a virtual environment over one or more portions of the video image to form a virtual scene and a set of goggles to render the virtual scene.

30 Claims, 10 Drawing Sheets

(56) References Cited

U.S. PATENT DOCUMENTS

| | | | |
|---|---|---|---|
| 6,786,863 B2 * | 9/2004 | Abbasi | 600/38 |
| 6,832,132 B2 | 12/2004 | Ishida et al. | |
| 6,845,297 B2 * | 1/2005 | Allard | 700/259 |
| 6,920,376 B2 * | 7/2005 | Jouppi et al. | 700/259 |
| 6,958,746 B1 * | 10/2005 | Anderson et al. | 345/161 |
| 7,046,151 B2 * | 5/2006 | Dundon | 340/573.1 |
| 7,095,422 B2 | 8/2006 | Shouji | |
| 7,124,186 B2 | 10/2006 | Piccionelli | |
| 7,164,969 B2 | 1/2007 | Wang et al. | |
| 7,164,970 B2 | 1/2007 | Wang et al. | |
| 7,333,622 B2 | 2/2008 | Algazi et al. | |
| 7,447,564 B2 * | 11/2008 | Yasukawa et al. | 700/246 |
| 2002/0049566 A1 | 4/2002 | Friedrich et al. | |
| 2002/0080094 A1 | 6/2002 | Biocca et al. | |
| 2002/0116352 A1 | 8/2002 | Kilgard et al. | |
| 2002/0186881 A1 * | 12/2002 | Li | 382/164 |
| 2003/0030397 A1 | 2/2003 | Simmons | |
| 2003/0036678 A1 | 2/2003 | Abbasi | |
| 2003/0093248 A1 | 5/2003 | Vock et al. | |
| 2003/0229419 A1 | 12/2003 | Ishida et al. | |
| 2004/0046777 A1 | 3/2004 | Tremblay et al. | |
| 2004/0088077 A1 * | 5/2004 | Jouppi et al. | 700/245 |
| 2004/0104935 A1 | 6/2004 | Williamson et al. | |
| 2005/0027794 A1 | 2/2005 | Decker | |
| 2005/0130108 A1 | 6/2005 | Kurzweil | |
| 2005/0131580 A1 | 6/2005 | Kurzweil | |
| 2005/0131846 A1 | 6/2005 | Kurzweil | |
| 2005/0140776 A1 | 6/2005 | Kurzweil | |

OTHER PUBLICATIONS

Kanehiro et al., "Virtual Humanoid Robot Platfrom to Develop Controllers of Real Humanoid Robots without Porting", IEEE, p. 1093-1099, 2001.

Hou et al., "Teleoperation Characteristics and Human Response Factor in Relation of a Robotic Welding System", IEEE, p. 1195-1202, 1999.

Kalra et al., "Real-Time Animation of Realistic Virtual Humans", IEEE, p. 42-56, 1998.

* cited by examiner

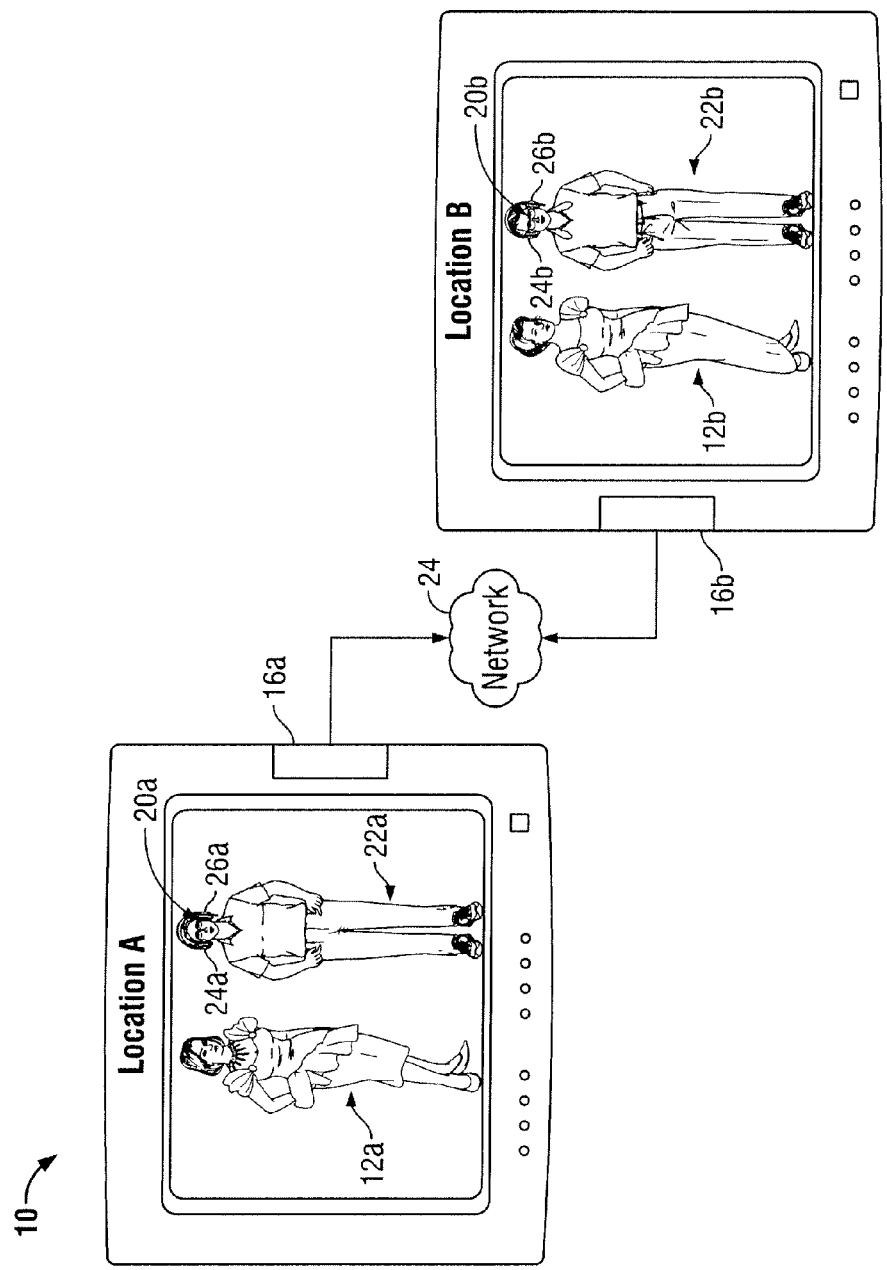

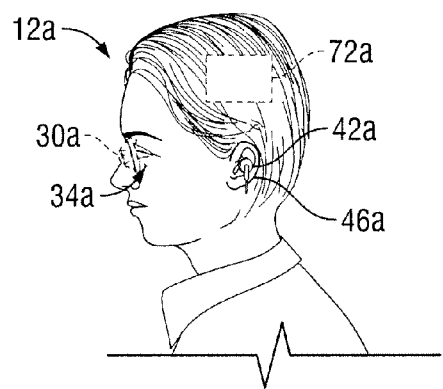
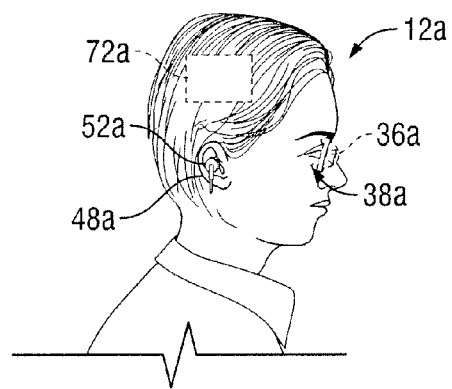
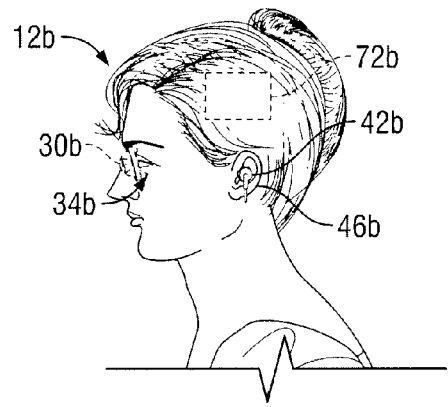
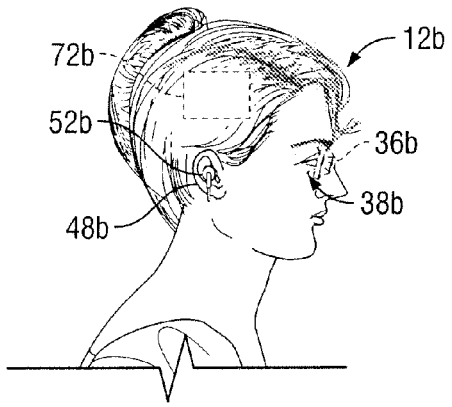
FIG. 2A  FIG. 2B

VIRTUAL ENCOUNTERS

TECHNICAL FIELD

This disclosure relates to virtual reality devices, and in particular, using these devices for communication and contact.

BACKGROUND

Two people can be separated by thousands of miles or across a town. With the development of the telephone, two people can hear each other's voice, and, to each of them, the experience is as if the other person was right next to them. Other developments have increased the perception of physical closeness. For example, teleconferencing and Internet cameras allow two people to see each other as well as hear each other over long distances.

SUMMARY

In one aspect, the invention is a virtual encounter system that includes a mannequin coupled to a camera for receiving a video image. The camera sends the video image to a communications network. The virtual encounter system also includes a processor for overlaying a virtual environment over one or more portions of the video image to form a virtual scene and a set of goggles to render the virtual scene.

In another aspect, the invention is a method of having a virtual encounter. The method includes receiving a video image at a camera coupled to a mannequin. The camera sends the video image to a communications network. The method also includes overlaying a virtual environment over one or more portions of the video image to form a virtual scene and rendering the virtual scene using a set of goggles.

One or more of the aspects above have one or more of the following advantages. The virtual encounter system adds a higher level of perception that two people are in the same place. Aspects of the system allow two people to touch and to feel each other as well as manipulate objects in each other's environment. Thus, a business person can shake a client's hand from across an ocean. Parents on business trips can read to their children at home and put them to bed. People using the system while in two different locations can interact with each other in a virtual environment of their own selection, e.g., a beach or a mountaintop. People can change their physical appearance in the virtual environment so that they seem taller or thinner to the other person or become any entity of their own choosing.

DESCRIPTION OF THE DRAWINGS

FIG. 1 is a view of a virtual encounter system.
FIG. 2A is a view of a left side of a head of a mannequin.
FIG. 2B is a view of a right side of the head of the mannequin.

DESCRIPTION

Figure 3:
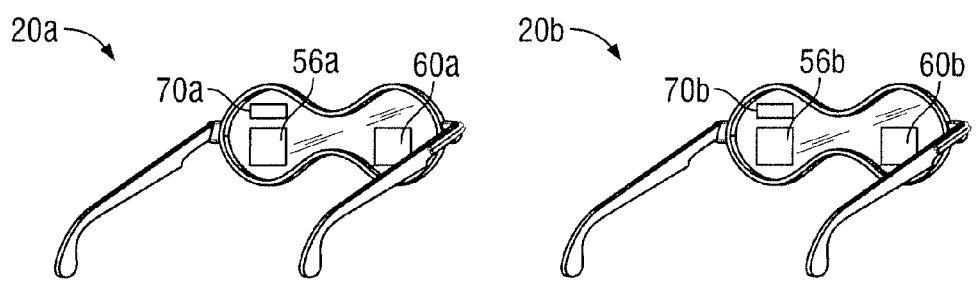
FIG. 3 is a view of a set of virtual glasses.

Referring to FIG. 1, a virtual encounter system 10 includes in a first location A, a mannequin 12a, a communication gateway 16a, a set of goggles 20a worn by a user 22a, and two wireless earphones (earphone 24a and earphone 26a) also worn by user 22a. System 10 can further include in a location B, a mannequin 12b, a communication gateway 16b, a set of goggles 20b worn by a user 22b, and two wireless earphones (earphone 24b and earphone 26b) also worn by user 22b. Gateway 16a and gateway 16b are connected by a network 24 (e.g., the Internet).

As will be explained below, when user 22a interacts with mannequin 12a in location A by seeing and hearing the mannequin, user 22a perceives seeing user 22b and hearing user 22b in location B. Likewise, user 22b listens and sees mannequin 12b but perceives listening and seeing user 22a in location A. Details of the gateways 16a and 16b are discussed below. Suffice it to say that the gateways 16a and 16b execute processes to process and transport raw data produced for instance when users 22a and 22b interact with respective mannequins 12a and 12b.

Referring to FIGS. 2A and 2B, each mannequin 12a-12b includes a camera (e.g., camera 30a and camera 30b) positioned in a left eye socket (e.g., left eye socket 34a and left eye socket 34b), and a camera (e.g., camera 36a and camera 36b) positioned in a right eye socket (e.g., right eye socket 38a and right eye socket 38b).

Each mannequin 12a-12b also includes a microphone (e.g., microphone 42a and microphone 42b) positioned within a left ear (e.g., left ear 46a and left ear 46b), and a microphone (e.g., microphone 48a and microphone 48b) positioned within a right ear (e.g., right ear 52a and right ear 52b).

Each mannequin 12a-12b further includes a transmitter (e.g., transmitter 72a and transmitter 72b) containing a battery (not shown). Transmitters 72a-72b send the audio and video signals from the cameras and the microphones to communication gateway 16a-16b.

Referring to FIG. 3, each set of goggles 20a and 20b includes one left display (left display 56a and left display 56b) and one right display (right display 60a and right display 60b). Each set of goggles 20a and 20b includes a receiver (e.g., receiver 70a and receiver 70b) containing a battery source (not shown). Receivers 70a-70b receive the audio and video signals transmitted from processors 16a-16b.

Figure 4:
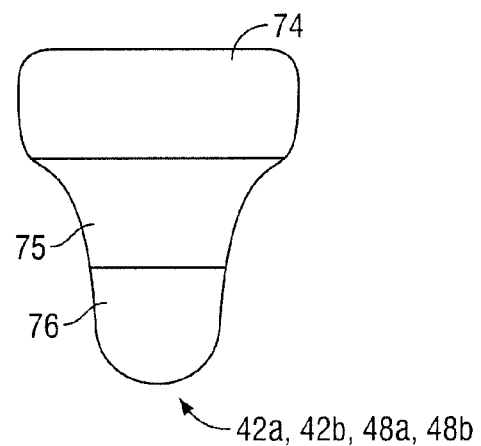
FIG. 4 is a view of a wireless earphone.

Referring to FIG. 4, each earphone 24a, 24b, 26a and 26b includes a receiver 74 for receiving audio signals from a corresponding microphone 42a, 42b, 48a and 48b an amplifier 75 for amplifying the audio signal and a transducer 76 for broadcasting audio signals.

Figure 5:
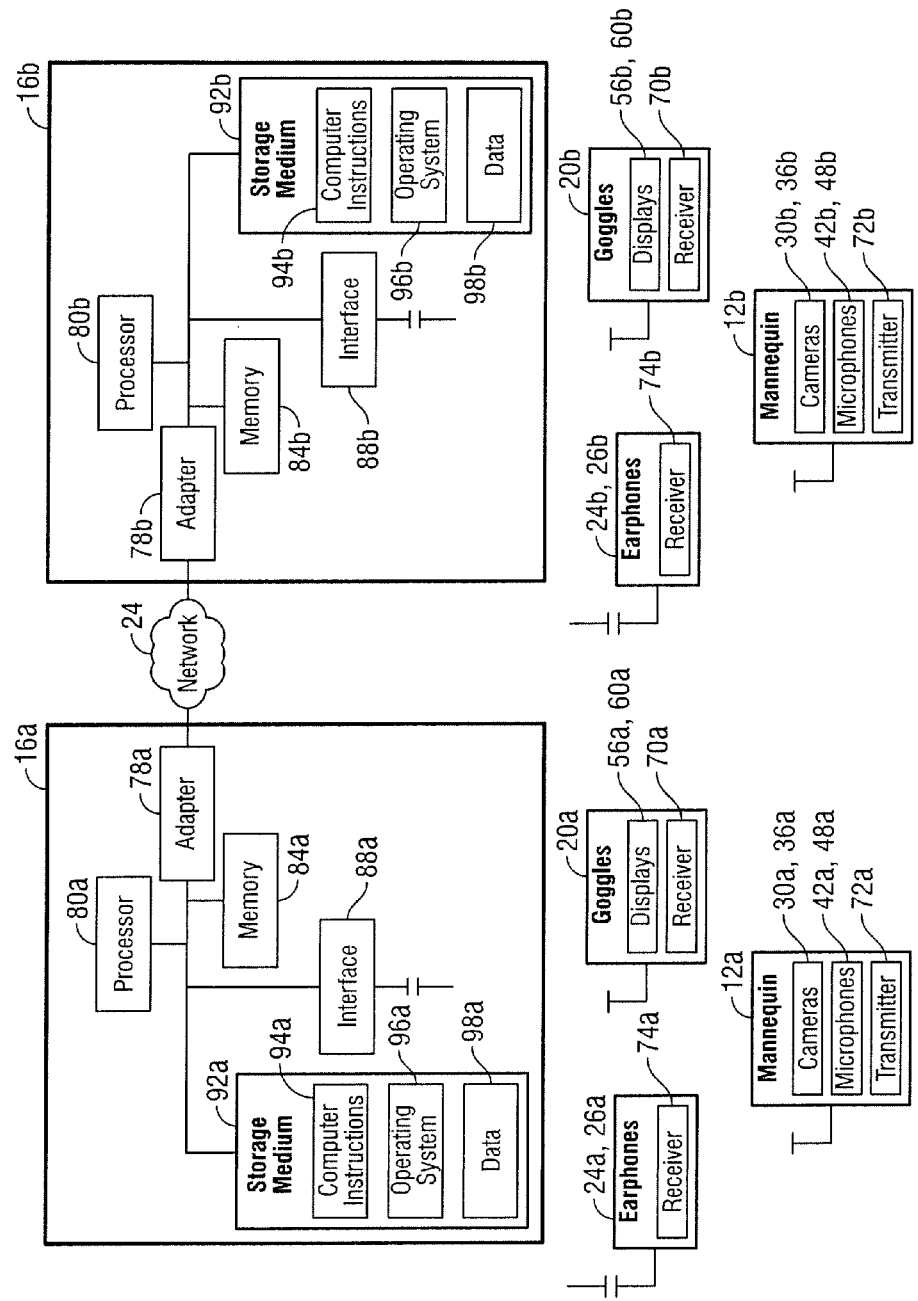
FIG. 5 is a functional diagram of the virtual encounter system.

Referring to FIG. 5, each communication gateway 16a-16b includes an adapter 78a-78b, a processor 80a-80b, memory 84a-84b, an interface 88a-88b and a storage medium 92a-92b (e.g., a hard disk). Each adapter 78a-78b establishes a bi-directional signal connection with network 24.

Each interface 88a-88b receives, via transmitter 72a-78b in mannequin 12a-12b, video signals from cameras 30a-30b, 36a-36b and audio signals from microphones 42a-42b, 48a-48b. Each interface 88a-88b sends video signals to displays 56a, 56b in goggles 20a-20b via receiver 70a-70b. Each interface 88a sends audio signals to earphones 24a-24b, 26a-26b in goggles 20a-20b via receiver 74a-74b.

Each storage medium 92a-92b stores an operating system 96a-96b, data 98a-98b for establishing communications links with other communication gateways, and computer instructions 94a-94b which are executed by processor 80a-80b in respective memories 84a-84b to coordinate, send and receive audio, visual and other sensory signals to and from network 24.

Signals within system 10 are sent using a standard streaming connection using time-stamped packets or a stream of bits over a continuous connection. Other examples, include using a direct connection such as an integrated services digital network (ISDN).

Figure 6:
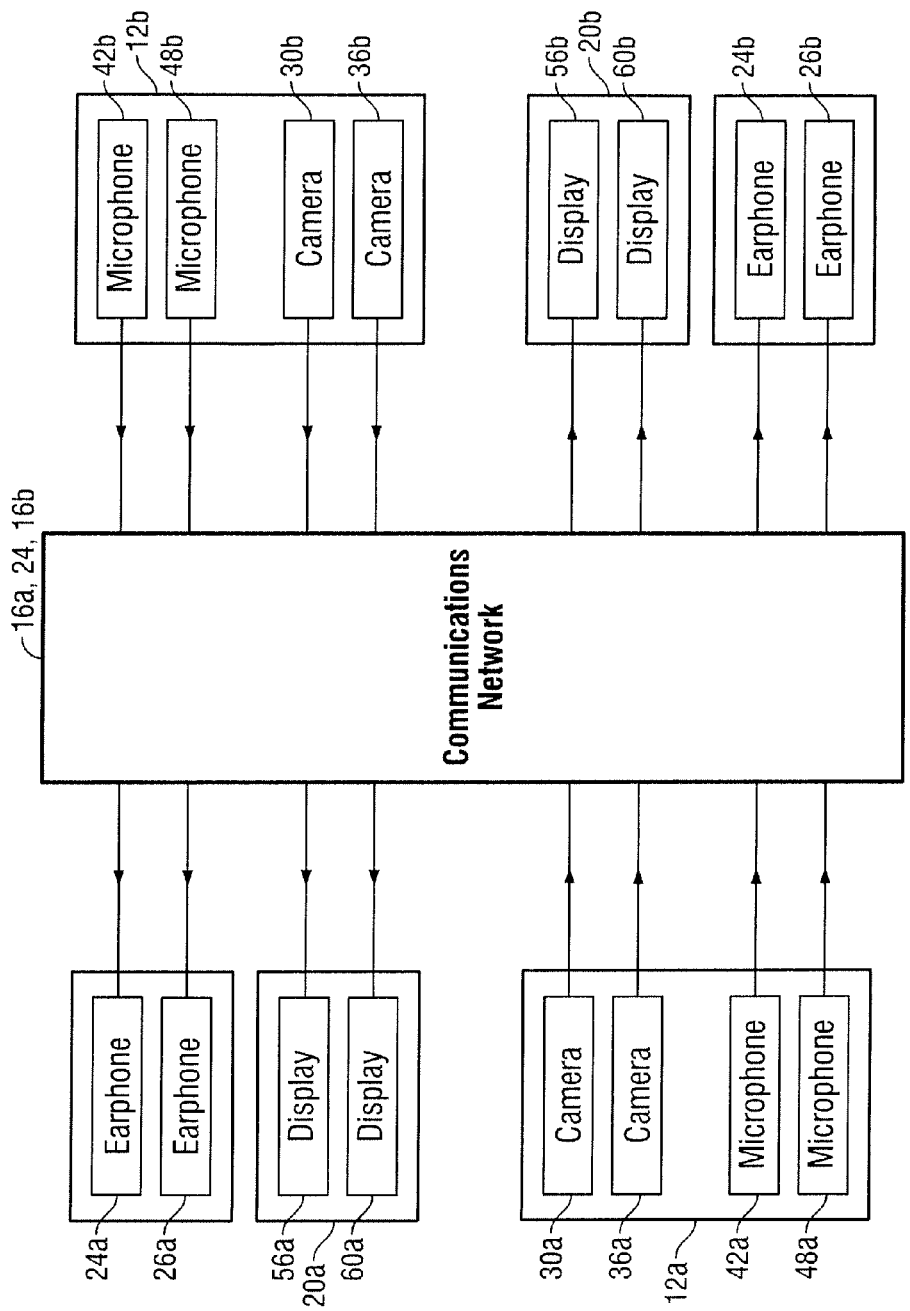
FIG. 6 is a signal flow diagram of the virtual encounter system.

Referring to FIG. 6, in operation, camera 30b and camera 36b record video images from Location B. The video images are transmitted wirelessly to communication gateway 16b as video signals. Communication gateway 16b sends the video signals through network 28 to communication gateway 16a. Communication gateway 16b transmits the video signals wirelessly to set of goggles 20a. The video images recorded by camera 30b are rendered on to display 56a, and the video images recorded on camera 36b are rendered on to display 60a.

Likewise, communication gateway 16a and communication gateway 16b work in the opposite direction through network 24, so that the video images, from location A, recorded by camera 30a are rendered on to display 56b. The video images, recorded by camera 36a are rendered on display 60b.

The sounds received by microphone 42a in location A, are transmitted to earphone 24b and sounds received in location A by microphone 52a are transmitted to earphone 26b. The sounds received by microphone 42b in location B, are transmitted to earphone 24a and sounds received in location B by microphone 52b are transmitted to earphone 26a.

Using system 10, two people can have a conversation where each of the persons perceives that the other is in the same location as them.

Figure 7A:
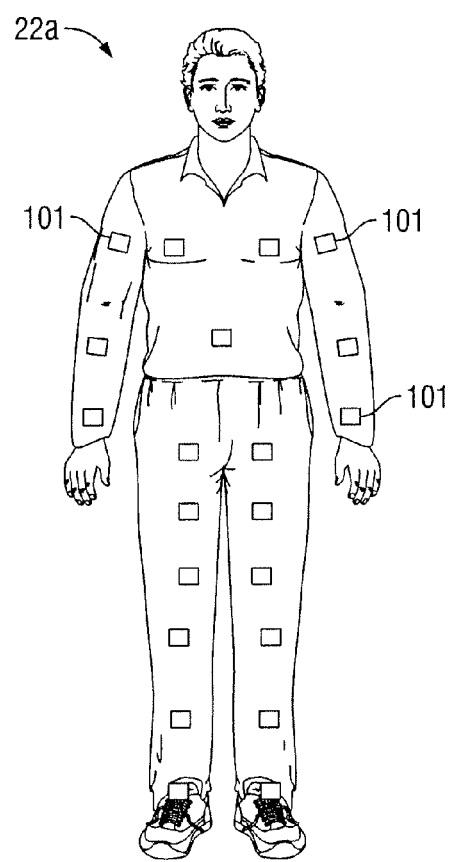
FIG. 7A is a view of a user with motion sensors.
Figure 7B:
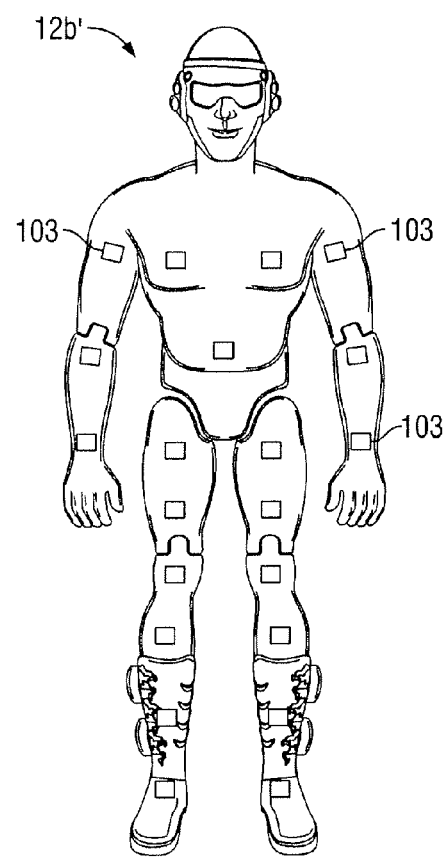
FIG. 7B is a view of a robot with motion actuators.

Referring to FIGS. 7A and 7B, the user 22a is shown wearing motion sensors 101, over portions of their bodies, and in particular over those portions of the body that exhibit movement. In addition, the mannequins are replaced by robots. For example, a robot 12b' includes a series of motion actuators 103. Each motion actuator 103 placement corresponds to a motion sensor 101 on the user 22a so that each motion sensor activates a motion actuator in the robot that makes the corresponding movement.

For example, when the user 22a moves their right hand, a sensor in the right hand sends a signal through the network to a motion actuator on the robot 12b'. The robot 12b' in turn moves its right hand.

In another example, a user 22a can walk towards a robot 12a' in location A. All the sensors on the user 22a send a corresponding signal to the actuators on the robot 12b' in location B. The robot 12b' in location B performs the same walking movement. The user 22b in location B is not looking in location B but rather through the eyes of the robot 12a' in location A so that user 22b does see the user 22a in location A walking towards them, but not because the robot 12b' in location B is walking. However, the fact that the robot 12b' in location B is walking enables two things to happen. First, since the user 22a in location A is seeing through the eyes of the robot 12b' in location B and since the robot 12b' in location B is walking enables the user 22a in location A to see what he would see if he were indeed walking in location B. Second, it enables the robot 12b' in location B to meet up with the user 22b in location B.

Figure 8A:
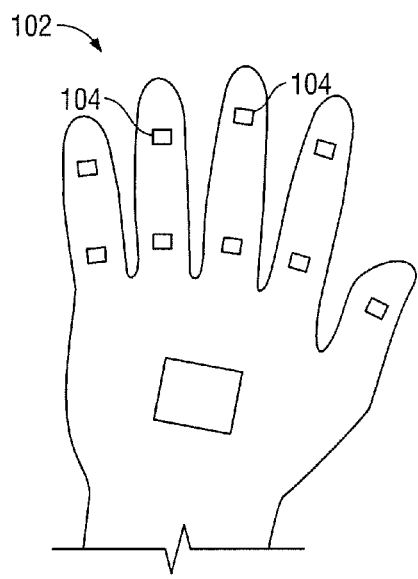
FIG. 8A is a view of a left hand of the robot.
Figure 8B:
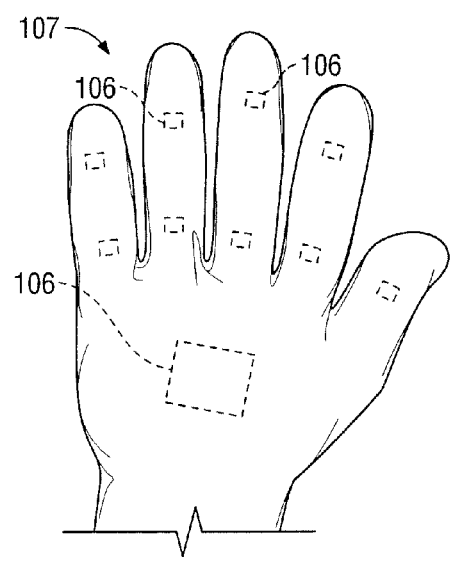
FIG. 8B is a view a left glove worn by the user.

Referring to FIGS. 8A and 8B, in still other embodiments, tactile sensors 104 are placed on the exterior of a robot hand 102 located in Location A. Corresponding tactile actuators 106 are sewn into an interior of a glove 107 worn by a user in location B. Using system 10, a user in location B can feel objects in Location A. For example, a user can see a vase within a room, walk over to the vase, and pick-up the vase. The tactile sensors-actuators are sensitive enough so that the user can feel the texture of the vase.

Figure 9A:
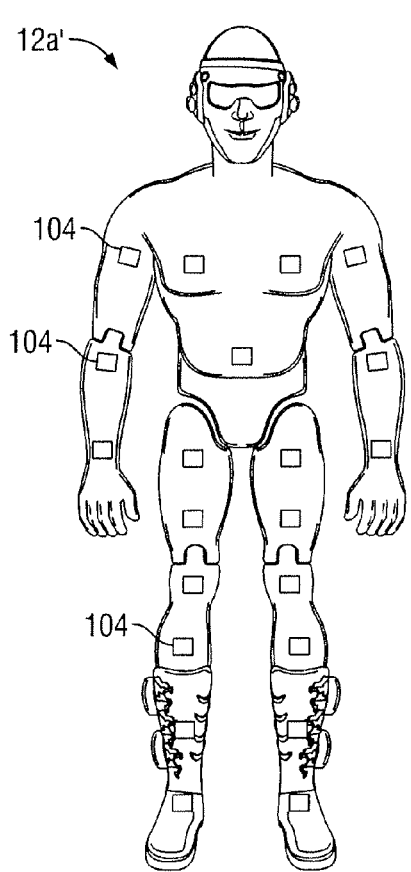
FIG. 9A is a view of a robot with tactile actuators.
Figure 9B:
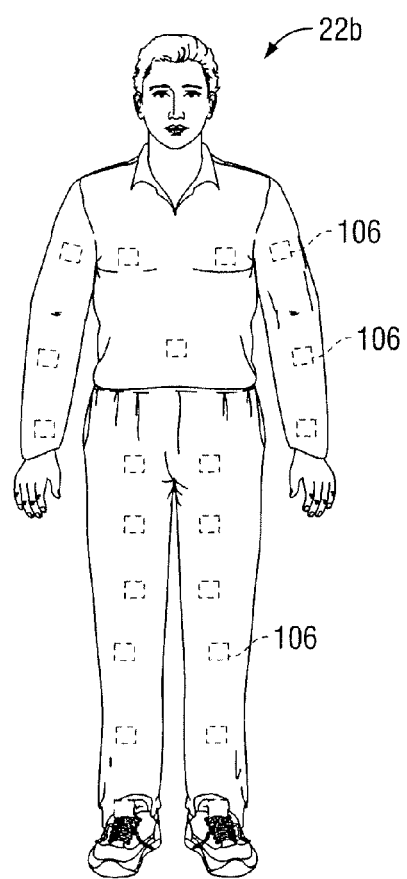
FIG. 9B is a view of the user with tactile sensors.

Referring to FIGS. 9A and 9B, in other embodiments, sensors are placed over various parts of a robot. Corresponding actuators can be sewn in the interior of a body suit that is worn by a user. The sensors and their corresponding actuators are calibrated so that more sensitive regions of a human are calibrated with a higher degree of sensitivity.

Figure 10A:
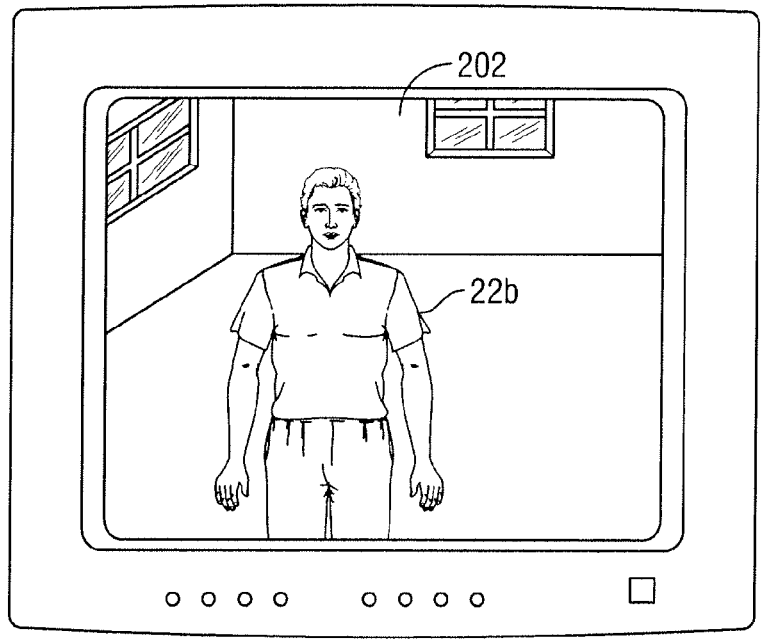
FIG. 10A is a view of a scene with the user in a room.
Figure 10B:
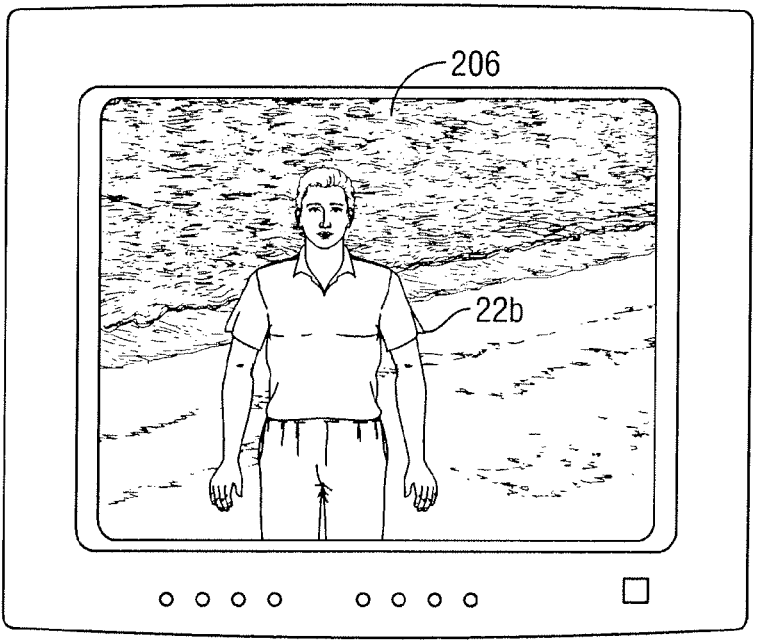
FIG. 10B is a view of the scene with the user on a beach.

Referring to FIGS. 10A and 10B in other embodiments, user 22a can receive an image of a user 22b but the actual background behind user 22b is altered. For example, user 22b is in a room 202 but user 22a perceives user 22b on a beach 206 or on a mountaintop (not shown). Using conventional video image editing techniques, the communication gateway 16a processes the signals received from Location B and removes or blanks-out the video image except for the portion that has the user 22b. For the blanked out areas on the image, the communication gateway 16a overlays a replacement background, e.g., virtual environment to have the user 22b appear to user 22a in a different environment. Generally, the system can be configured so that either user 22a or user 22b can control how the user 22b is perceived by the user 22a. Communication gateway 16a using conventional techniques can supplement the audio signals received with stored virtual sounds. For example, waves are added to a beach scene, or eagles screaming are added to a mountaintop scene.

In addition, gateway 16a can also supplement tactile sensations with stored virtual tactile sensations. For example, a user can feel the sand on her feet in the beach scene or a cold breeze on her cheeks in a mountain top scene.

In this embodiment, each storage medium 92a-92b stores data 98a-98b for generating a virtual environment including virtual visual images, virtual audio signals, and virtual tactile signals. Computer instructions 94a-94b, which are executed by processor 80a-80b out of memory 84a-84b, combine the visual, audio, and tactile signals received with the stored virtual visual, virtual audio and virtual tactile signals in data 98a-98b.

Figure 11A:
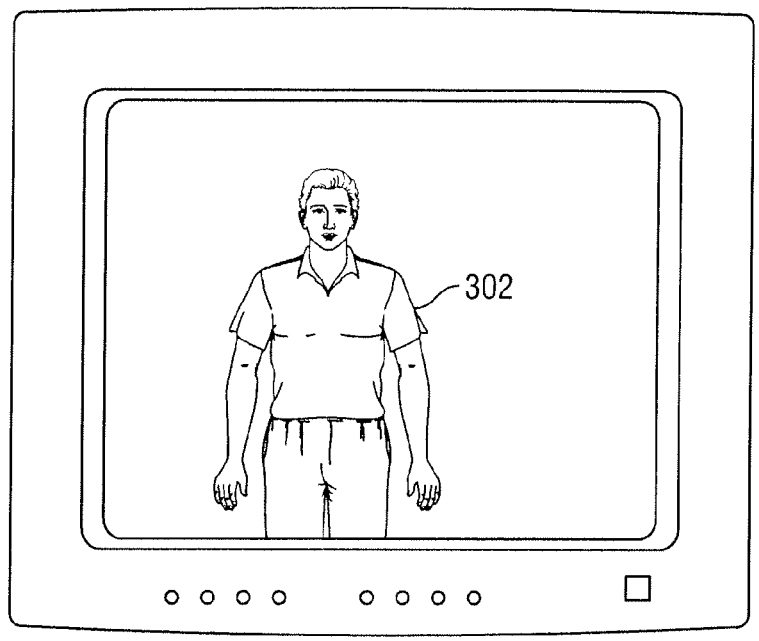
FIG. 11A is a view of an image of the user.
Figure 11B:
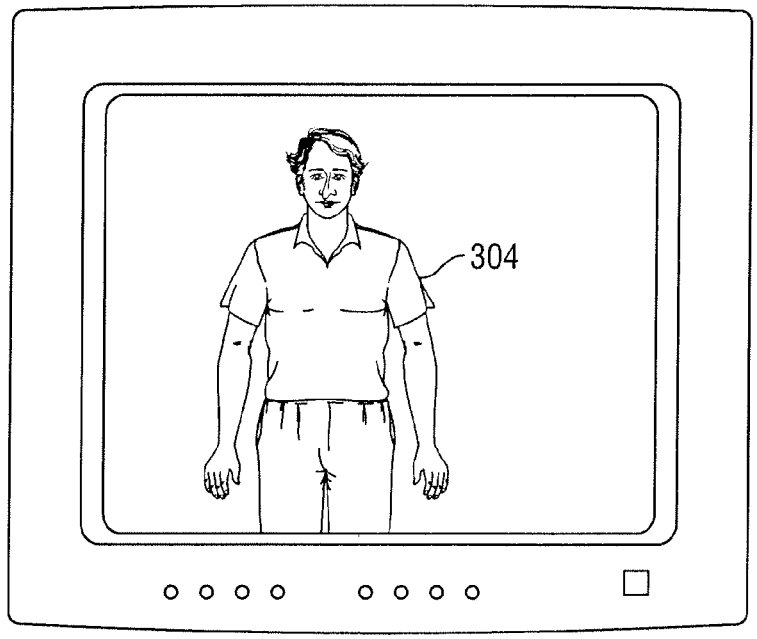
FIG. 11B is a view of a morphed image of the user.

Referring to FIGS. 11A and 11B, in other embodiments, a user 22a can receive a morphed image 304 of user 22b. For example, an image 302 of user 22b is transmitted through network 24 to communications gateway 16a. User 22b has brown hair, brown eyes and a large nose. Communications gateway 16a again using conventional imaging morphing techniques alters the image of user 22b so that user 22b has blond hair, blue eyes and a small noise nose and sends that image to goggles 20a to be rendered.

Communication gateway 16a also changes the sound user 22b makes as perceived by user 22a. For example, user 22b has a high-pitched squeaky voice. Communication gateway 22b using conventional techniques can alter the audio signal representing the voice of user 22b to be a low deep voice.

In addition, communication gateway 16a can alter the tactile sensation. For example, user 22b has cold, dry and scaling skin. Communications gateway 16a can alter the perception of user 22*a* by sending tactile signals that make the skin of user 22*b* seem smooth and soft.

In this embodiment, each storage medium 92*a*-92*b* stores data 98*a*-98*b* for generating a morph personality. Computer instructions 94*a*-94*b*, which are executed by processor 80*a*-80*b* out of memory 84*a*-84*b*, combine the visual, audio, and tactile signals received with the stored virtual visual, virtual audio and virtual tactile signals of a personality in data 98*a*-98*b*.

Thus using system 10 anyone can assume any other identity if it is stored in data 98*a*-98*b*.

In other embodiments, earphones are connected to the goggles. The goggles and the earphones are hooked by a cable to a port (not shown) on the communication gateway.

Other embodiments not described herein are also within the scope of the following claims.

What is claimed is:

1. A virtual reality encounter system comprising:
   a first mannequin;
   a first camera supported by the first mannequin, the first camera for capturing a first image of a scene having a first environment in which the first mannequin is disposed;
   a first processor receiving in real time the first image of the scene from the first camera supported by the mannequin, the first processor overlaying a virtual environment over one or more portions of the real-time received first image to form a first image of a virtual scene with the first image of the virtual scene including at least one remaining portion of the real-time received first image having the first environment, and with the overlaid virtual environment of the one or more portions, being a replacement background that has the scene that the first mannequin captures in the first image being replaced with a different environment from the first environment; and
   sending the first image of the virtual scene including the at least one remaining portion of the real-time received first image in real time to a communications network; and
   a first set of goggles to render a second image of a virtual scene from signals received from the communications network.

2. The system of claim 1, wherein the first mannequin is a first humanoid robot having tactile sensors positioned along the exterior of the first robot, the sensors sending first tactile signals to the communications network; the system further including a body suit having tactile actuators, the tactile actuators receiving second tactile signals from the communications network.

3. The system of claim 2 further comprising: wherein the first robot comprises a transmitter to wirelessly send the tactile signals and the first image to the communications network.

4. The system of claim 2, further comprising:
   motion sensors positioned throughout the body suit, the motion sensors sending motion signals corresponding to movements of each sensor relative to a reference point, the motion signals transmitted to the communications network; and
   a second humanoid robot, receiving, from the communications network, the motion signals from the motion sensors, the motion signals from the motion sensors causing a movement of the second robot that is correlated to a movement of the body suit.

5. The system of claim 4, wherein the second robot includes motion actuators corresponding to the motion sensors, the motion actuators causing the second robot to move.

6. The system of claim 4, wherein the second robot has life-like features, the second robot comprises:
   a body; and
   a microphone coupled to the body, the microphone for sending audio signals to the communications network.

7. The system of claim 6, wherein the first set of goggles further includes a first transducer to render the audio signals received from the microphone.

8. The system of claim 7, wherein the communications network comprises an interface having one or more channels for:
   receiving the audio signals from the microphone;
   receiving the first image from the first camera;
   sending signals representing the second image of a virtual scene to the first set of goggles; and
   sending the audio signals to the first transducer.

9. The system of claim 6, wherein the first set of the goggles and the first robot is at a first location and the first robot includes a first microphone for sending first audio signals to the communications network,
   wherein the second humanoid robot is at a second location and the body of the second robot supports a second camera, the microphone coupled to the body of the second robot being a second microphone and the audio signals sent by the second microphone being second audio signals; and
   the system further comprising a second set of goggles to receive the first image of the virtual scene including at least one remaining portion of the real-time received first image and to receive the first audio signals from the first microphone.

10. The system of claim 9, wherein the communications network comprises:
    a first communication gateway in the first location; and
    a second communication gateway in the second location, and the system further comprising a second processor connected to the first processor via a network.

11. The system of claim 9, wherein the body includes an eye socket and the second camera is positioned in the eye socket.

12. The system of claim 9, wherein the body includes an ear canal and the second microphone is positioned within the ear canal.

13. The system of claim 1, wherein the first set of goggles comprises a receiver to receive the second image of a virtual scene.

14. A method of having a virtual encounter, comprising:
    receiving in real time a first video image of a scene in a first environment from a first camera coupled to a first mannequin, the first camera sending the first video image to a communications network;
    sending first audio signals over the communications network, the first audio signals being produced from a first microphone coupled to the first mannequin;
    overlaying a virtual environment over one or more portions of the first video image to form a first virtual scene, the first virtual scene including at least a remaining portion of the first video image and with the overlaid virtual environment of the one or more portions, being a replacement background that has the scene captured by the first camera on the first mannequin replaced with a different environment from the first environment;

rendering in real time the first virtual scene using a first set of goggles;
transducing the first audio signals received from the communications network using a transducer embedded in the first set of goggles;
sending second audio signals to the communications network from a second microphone coupled to a second mannequin having life-like features;
sending a second video image to the communications network from a second camera coupled to the second mannequin;
rendering the second image received from the communications network onto a monitor coupled to a second set of goggles; and
transducing the second audio signals received from the communications network using a second transducer embedded in the second set of goggles; and
sending from motion sensors positioned throughout a body suit motion actuating signals to first motion actuators over the communications network.

15. The method of claim 14, wherein the first mannequin is a first humanoid robot the body suit is a first body suit, and the method further comprises:
sending tactile signals received from tactile sensors positioned along an exterior of the first humanoid robot to the communications network; and
receiving the tactile signals from the communications network at a second body suit having tactile actuators.

16. The method of claim 15, further comprising:
sending motion signals from motion sensors positioned throughout the surface of a human, the motion signals corresponding to movements of each sensor relative to a reference point, the motion signals being transmitted to the communications network;
receiving, at the first humanoid robot, the motion signals sent by the motion sensors; and
causing a movement of the first humanoid robot that is correlated to a movement of the human based on the motion signals received from the motion sensors.

17. The method of claim 16, wherein receiving the motion signals comprises receiving motion signals from the motion sensors at corresponding motion actuators coupled to the first robot, causing a movement comprises the motion actuators causing the robot to move.

18. The method of claim 14, wherein the first set of goggles comprises a display to render the first virtual scene.

19. A method of having a virtual encounter, comprising:
receiving in real time a first video image of a first environment from a first camera coupled to a first mannequin, the first camera sending the first video image to a communications network;
sending first audio signals over the communications network, the first audio signals being produced from a first microphone coupled to the first mannequin;
overlaying a virtual environment over one or more portions of the first video image to form a first virtual scene, the first virtual scene including at least a remaining portion of the first video image, and with the overlaid virtual environment of the one or more portions, being a replacement background that replaces the first environment that the first mannequin captures in the first image with a different environment from the first environment; and
rendering in real time the first virtual scene using a first set of goggles.

20. The method of claim 19, further comprising:
sending second audio signals to the communications network from a second microphone coupled to a second mannequin having life-like features;
sending a second video image to the communications network from a second camera coupled to the second mannequin;
rendering the second image received from the communications network onto a monitor coupled to a second set of goggles; and
transducing the audio signals received from the communications network using a second transducer embedded in the second set of goggles.

21. The method of claim 20, wherein the second mannequin includes an eye socket and the second camera is positioned in the eye socket.

22. The method of claim 20, wherein the second mannequin includes an ear canal and further comprising positioning the second microphone within the ear canal.

23. The method of claim 20, wherein the second mannequin further comprises a transmitter to wirelessly send the second audio signals and the second video image to the communications network.

24. A virtual reality encounter system comprising:
a first mannequin including:
a first camera supported by the first mannequin, the first camera for capturing a first real-time image of a scene that encompasses a first environment in which the first mannequin is disposed;
a second mannequin including:
a second camera supported by the second mannequin, the second camera for capturing a second real-time image of a scene that encompasses the environment in which the second mannequin is disposed;
first motion sensors disposed over the second mannequin, the first motion sensors sending first motion signals over a communications network, and
first motion actuators disposed over the second mannequin, the first motion actuators receiving second, different motion signals from the communications network the second, different motion signals being different from the first motion signals;
a processor receiving in real time and processing the first real-time image and the second real-time image over the communications network, the processor configured to:
overlay a virtual environment over one or more portions of the received first real-time image to form a first image of a virtual scene with the first image of the virtual scene including at least one remaining portion of the first real-time image and with the overlaid virtual environment of the one or more portions, being a replacement background that has the scene captured by the first camera on the first mannequin replaced with a different environment from the first environment;
overlay a virtual environment over one or more portions of the received second real-time image to form a second image of a virtual scene with the second image of the virtual scene including at least one remaining portion of the second real-time image;
a set of goggles having a display, the set of goggles receiving and rendering on the display at least one of the first image of a virtual scene and the second image of a virtual scene from the communications network; and a body suit having second motion sensors disposed over the body suit, the second motion sensors sending the second, different motion actuating signals to the first motion actuators over the communications network, the body suit further having second motion actuators disposed over the body suit, the second motion actuators receiving the first motion signals from the first motion sensors over the communications network.

25. The system of claim 24, wherein the first mannequin is a humanoid robot having tactile sensors and tactile actuators.

26. A virtual reality encounter system comprising:
a first humanoid robot having tactile sensors positioned along the exterior of the first robot, the sensors sending first tactile signals to a communications network;
the system further including a body suit, including
tactile actuators, the tactile actuators receiving second tactile signals from the communications network;
motion sensors positioned throughout the body suit, the motion sensors sending motion signals corresponding to movements of each sensor relative to a reference point, the motion signals transmitted to the communications network; and
a second humanoid robot, receiving, from the communications network, the motion signals from the motion sensors, the motion signals from the motion sensors causing a movement of the second robot that is correlated to a movement of the body suit;
a first camera supported by the first mannequin, the first camera for capturing a first image of a scene of a first environment that the first mannequin is disposed;
a first processor receiving in real time the first image of the scene from the first camera supported by the mannequin, the first processor overlaying a virtual environment over one or more portions of the real-time received first image to form a first image of a virtual scene with the first image of the virtual scene including at least one remaining portion of the real-time received first image and with the overlaid virtual environment of the one or more portions, being a replacement background that has the first environment captured by the first camera on the first mannequin replaced with a different environment from the first environment;
and sending the first image of the virtual scene including the at least one remaining portion of the real-time received first image in real time to a communications network; and
a first set of goggles to render a second image of a virtual scene from signals received from the communications network.

27. The system of claim 26, wherein the second robot includes motion actuators corresponding to the motion sensors, the motion actuators causing the second robot to move.

28. The system of claim 27, wherein the first set of the goggles and the first robot are at a first location, and the first robot includes a first microphone for sending first audio signals to the communications network, the second humanoid robot is at a second, different location and the body of the second robot supports a second camera and a second microphone coupled to the body of the second robot, being a second microphone and audio signals sent by the second microphone being second audio signals; and
the system further comprising a second set of goggles to receive the first image of the virtual scene including at least one remaining portion of the real-time received first image and to receive the first audio signals from the first microphone.

29. The system of claim 27, wherein the communications network comprises:
a first communication gateway in the first location; and
a second communication gateway in the second location, and the system further comprises
a second processor connected to the first processor via the network.

30. The system of claim 27 wherein the first set of goggles comprises a receiver to receive the second image of a virtual scene;
the first processor overlaying the virtual environment overlays the virtual environment as a replacement background that has the scene that the first mannequin captures in the first image having the mannequin appear in a different environment; and
the second set of goggles receives the overlays the virtual environment as the replacement background.

\* \* \* \* \*